(12) United States Patent
Kallstenius

(10) Patent No.: US 7,415,044 B2
(45) Date of Patent: Aug. 19, 2008

(54) REMOTE SYNCHRONIZATION IN PACKET-SWITCHED NETWORKS

(75) Inventor: Thomas Kallstenius, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 912 days.

(21) Appl. No.: 10/645,837

(22) Filed: Aug. 22, 2003

(65) Prior Publication Data

US 2005/0041692 A1    Feb. 24, 2005

(51) Int. Cl.
 H04J 3/06    (2006.01)
 H04J 1/16    (2006.01)
 H04L 12/28   (2006.01)
 H04L 7/04    (2006.01)

(52) U.S. Cl. .................. 370/516; 370/252; 370/389; 370/350; 375/362

(58) Field of Classification Search .................. 370/350, 370/345, 498, 503, 466, 516; 375/376, 362, 375/354; 455/502
See application file for complete search history.

(56) References Cited

U.S. PATENT DOCUMENTS

| | | |
|---|---|---|
| 5,450,410 A | 9/1995 | Hiuchyj et al. |
| 5,544,324 A | 8/1996 | Edem et al. |
| 5,553,071 A | 9/1996 | Aranguren et al. |
| 5,566,169 A | 10/1996 | Rangan et al. |
| 5,594,732 A | 1/1997 | Bell et al. |
| 5,594,734 A | 1/1997 | Worsley et al. |
| 5,606,562 A | 2/1997 | Landguth |
| 5,617,418 A | 4/1997 | Shirani et al. |
| 5,668,811 A | 9/1997 | Worsley et al. |
| 5,687,174 A | 11/1997 | Edem et al. |
| 5,805,597 A | 9/1998 | Edem et al. |
| 5,862,343 A | 1/1999 | Landguth et al. |
| 5,999,525 A | 12/1999 | Krishnaswamy et al. |
| 6,064,673 A | 5/2000 | Anderson |
| 6,163,535 A | 12/2000 | Jordan et al. |
| 6,215,797 B1 | 4/2001 | Fellman et al. |
| 6,246,702 B1 | 6/2001 | Fellman et al. |
| 6,335,927 B1 | 1/2002 | Elliott et al. |
| 6,360,271 B1 | 3/2002 | Schuster et al. |

(Continued)

FOREIGN PATENT DOCUMENTS

EP    1 032 165 A1    8/2000

(Continued)

OTHER PUBLICATIONS

David Mills, Internet Time Synchronization: the Network Time Protocol[1,2,3] Electrical Engineering Department University of Delaware, pp. 1-14, Oct. 1991.

(Continued)

*Primary Examiner*—Huy D. Vu
*Assistant Examiner*—Nittaya Juntima
(74) *Attorney, Agent, or Firm*—Nixon & Vanderhye P.C.

(57) ABSTRACT

Remote frequency synchronization is achieved between two or more nodes in a packet-switched network using differential timestamps. A line is fit to multiple differential time values using a minimum delay principle. Frequency synchronization and/or absolute time synchronization between the two nodes may be achieved using one or both of uplink and downlink differential time values and fitting one or both of first and second lines to differential time values by different means of the minimum delay principle.

64 Claims, 8 Drawing Sheets

U.S. PATENT DOCUMENTS

| | | | |
|---|---|---|---|
| 6,434,606 B1 | 8/2002 | Boella et al. | |
| 6,438,702 B1 | 8/2002 | Hodge | |
| 6,577,872 B1 | 6/2003 | Lundh et al. | |
| 6,658,027 B1 | 12/2003 | Kramer et al. | |
| 6,661,810 B1 | 12/2003 | Skelly et al. | |
| 6,684,273 B2 | 1/2004 | Boulandet et al. | |
| 6,747,999 B1 | 6/2004 | Grosberg et al. | |
| 6,928,473 B1* | 8/2005 | Sundaram et al. | 709/224 |
| 6,983,161 B2* | 1/2006 | Wesby et al. | 455/502 |
| 7,130,368 B1* | 10/2006 | Aweya et al. | 375/376 |
| 2002/0007429 A1 | 1/2002 | Boulandet et al. | |
| 2002/0026568 A1 | 2/2002 | Jeon | |
| 2002/0075857 A1 | 6/2002 | LeBlanc | |
| 2002/0101885 A1 | 8/2002 | Progrebinsky et al. | |
| 2002/0120749 A1 | 8/2002 | Widegren et al. | |
| 2002/0141452 A1 | 10/2002 | Mauritz et al. | |
| 2002/0167911 A1 | 11/2002 | Hickey | |
| 2002/0181438 A1 | 12/2002 | McGibney | |
| 2003/0031210 A1 | 2/2003 | Harris | |
| 2003/0112758 A1 | 6/2003 | Pang et al. | |
| 2003/0152093 A1 | 8/2003 | Gupta et al. | |
| 2003/0152094 A1 | 8/2003 | Colavito et al. | |
| 2003/0169755 A1 | 9/2003 | Ternovsky | |
| 2003/0185222 A1 | 10/2003 | Goldstein | |
| 2003/0202528 A1 | 10/2003 | Eckberg | |
| 2004/0022262 A1 | 2/2004 | Vinnakota et al. | |
| 2004/0037320 A1 | 2/2004 | Dickson | |
| 2004/0057445 A1 | 3/2004 | LeBlanc | |
| 2004/0062252 A1 | 4/2004 | Dowdal et al. | |
| 2004/0062260 A1 | 4/2004 | Raetz et al. | |
| 2004/0073692 A1 | 4/2004 | Gentle et al. | |
| 2004/0076190 A1 | 4/2004 | Goel et al. | |
| 2004/0076191 A1 | 4/2004 | Sundqvist et al. | |
| 2004/0120309 A1 | 6/2004 | Kurittu et al. | |
| 2004/0156622 A1 | 8/2004 | Kent, Jr. et al. | |
| 2004/0258099 A1* | 12/2004 | Scott et al. | 370/503 |
| 2005/0220240 A1 | 10/2005 | Lesso | |
| 2006/0088000 A1 | 4/2006 | Hannu et al. | |

FOREIGN PATENT DOCUMENTS

| | | |
|---|---|---|
| EP | 12155559 | 6/2002 |
| EP | 1427121 | 6/2004 |
| WO | 00/16509 | 3/2000 |
| WO | 00/42728 | 7/2000 |
| WO | 01/20828 | 3/2001 |
| WO | 01/50657 | 7/2001 |
| WO | 01/50657 A2 | 7/2001 |
| WO | 02/13421 A2 | 2/2002 |
| WO | 02/054662 | 7/2002 |

OTHER PUBLICATIONS

Flavis Cristian, IBM Almaden Research Center, A Probabilistic Approach to Distributed Clock Synchronization, CH2706, 1989 IEEE, pp. 288-296.

Martin De Prycker et al., Terminal Synchronization in Asynchronous Networks, CH2424-0/87/0000-0800, 1987, IFFF, pp. 0800-0807.

William H. Press et al., Numerical Recipes in C: The Art of Scientific Computing, 2$^{nd}$ Edition, Published by the Press Syndicate of the University of Cambridge, 1988, pp. 658-665.

International Search Report and Written Opinion mailed Dec. 2, 2004 in corresponding PCT Application PCT/SE2004/001150.

Written Opinion of the International Preliminary Examining Authority mailed Aug. 23, 2005 in corresponding PCT Application PCT/SE2004/001150.

Petr et al, "Priority Discarding of Speech in Integrated Packet Networks", IEEE Journal on Selected Areas in Communications, vol. 7, No. 5, Jun. 1989, pp. 644-656.

OMA PoC User Plane, OMA-UP-POC=V0_1-20041005-D, Draft Version 1.0.9 Oct. 2004.

Written Opinion of the International Preliminary Examining Authority mailed Jan. 30, 2006 in corresponding PCT Application PCT/SE2005/001556.

International Search Report mailed Mar. 25, 2002 in PCT application PCT/SE01/02798.

International Preliminary Report on Patentability mailed Jan. 10, 2003 in PCT Application No. PCT/SE01/02798.

* cited by examiner

REMOTE SYNCHRONIZATION IN PACKET-SWITCHED NETWORKS

BACKGROUND

The present invention relates to remote node synchronization, and more particularly, to remote node synchronization over a packet-switched network where all intermediary nodes are not necessarily synchronized.

Because synchronous networks tend to be expensive, packet-switched networks are usually not synchronized meaning that there is no common reference clock in the network. The IEEE 802.3 standard, often referred to as Ethernet, is an example asynchronous network that uses free-running clocks in all nodes. Although asynchronous networks are appropriate for many applications, in other applications, synchronization is important or otherwise desirable.

One example application where synchronization is important is radio access network (RANs) used in mobile radio communications. Present day, circuit-switched RANs use plesiochronous digital hierarchy (PDH), (e.g. E1), or synchronous digital hierarchy (SDH), (e.g., STM-1), links between RAN nodes. Due to the well-controlled jitter and wander characteristics of these transmission technologies, clock-recovery techniques can be utilized to reach 50 parts-per-billion (ppb) frequency accuracy necessary for the third generation, wideband code-division multiple access (WCDMA) air interface.

Instead of using circuit-switched communications where synchronization is based on SDH or PDH, it would be desirable to employ packet-switched network technologies for RAN node communications since packet-switched network infrastructures already exist. If that were to occur, there will be intermediary repeaters, switches, and routers (hereafter referred to as intermediary nodes) between the RAN nodes like radio base stations (RBSs), radio network controllers (RNCs), or the like. The intermediary nodes inject delays and uncertainties into the synchronization process not encountered in circuit-switched networks. Nonetheless, certain applications, such as WCDMA as mentioned above, require frequency-synchronization at a very high accuracy, and may also require absolute time synchronization. The latter is important for several positioning method of cellular terminals, e.g., Global Positioning System (GPS)-assisted positioning. Moreover, clock-recovery techniques can not be used for packet-switched, asynchronous network technologies like Ethernet, Internet Protocol (IP), or Asynchronous Transfer Mode (ATM).

A solution is needed that generally provides means for remote node synchronization over packet-switched networks between a sending node and a receiving node without requiring synchronization of any intermediary nodes, That solution should also solve specific problems and needs associated with synchronizing RAN nodes that employ packet-switched communications, e.g., very accurate synchronization for both frequency and absolute time.

Synchronization over packet-switched networks can be achieved using several approaches. One approach is to adjust the receiving node's clock based on the "filling level" of an elastic jitter buffer, as shown in FIG. 1. Upper and lower window boundaries are defined around the middle of the jitter buffer. For every n samples, the average position of a buffer pointer is calculated. In normal operation, the average pointer position should be around the middle of the window. If the average pointer position goes above the upper window boundary or below the lower window boundary, the receiving node's clock is corrected to return the average pointer position to the middle of the buffer.

Drawbacks of this approach include sensitivity to frame/packet loss. If a frame/packet is lost, the buffer decreases. Another drawback is the requirement for timeservers with very accurate periodicity. Few accurate periodicity timeservers which allow ppb accuracy to be reached are available on the market, and they are slow, with a periodicity on the order several seconds.

Another approach for frequency synchronization over packet-switched networks employs periodic timestamp transmission illustrated in FIG. 2. A Timeserver Q (e.g., an RNC) sends timestamps to a client receiver P (e.g., an RBS) with a predetermined periodicity. The frequency drift and time offset between Q and P are estimated from the timestamp periodicity so the periodicity must be accurate. Drawbacks of this approach are similar to those described for the jitter buffer approach described above including sensitivity to frame/packet loss and timeservers with very accurate periodicity.

A third approach relies on time differences between the timeserver Q and the client P. Advantages include insensitivity to frame/packet loss and no periodicity requirement. FIG. 3 illustrates a one-way timestamp procedure. A timestamp message, e.g., a network time protocol (NTP) message, is sent from the timeserver to the client through a number of intermediary nodes (e.g., switches). When sending the message, the timeserver inserts an absolute local time $t_3$ in the message. When the client receives the message, it adds the absolute local time $t_4$ to the message. The differential time $\Delta t_{43}=t_4-t_3$ can then be calculated and evaluated by the client.

The differential time, in this case $\Delta t_{43}=t_4-t_3$, is compared with the absolute local time $t_4$ in the client. FIG. 4 shows multiple differential times $\Delta t_{43}$ being plotted relative to the absolute local time $t_4$. An oscillator frequency drift in the client appears as a drift in the differential time which is shown in FIG. 4 as a dashed line. The drift slope $\rho$ (i.e., the slope of the dashed line), corresponds to the client's frequency drift compared to the timeserver. A least-squares algorithm may be used to estimate the differential time drift, but it unfortunately requires a long convergence time.

SUMMARY

The invention provides for remote synchronization between nodes communication over a packet-switched network using a differential timestamp approach that is immune to packet loss. Only timestamps that arrive at the client are evaluated. A lost timestamp is not accounted for. Intermediary nodes need not be synchronized or modified. Periodicity (cyclic timing) is not required. A fast convergence time is achieved using a filtering process where a line is fit to multiple differential time values using a minimum delay principle. Frequency synchronization and/or absolute time synchronization between the two nodes may be achieved using one or both of uplink and downlink differential time values and fitting one or both of first and second lines to minimum differential time values.

A communications system includes a first node with a first oscillator that sends multiple messages over a packet-switched network. The first node includes or associates with each message a first timestamp corresponding to a time when the first node sent that message. A second node having a second oscillator receives each message and includes or associates with that message a second timestamp corresponding to a time when the second node received that message. One of the nodes determines for each message a first time difference between the corresponding first and second timestamps.

From multiple first time differences, the one node fits a line to two or more values of the first time differences. The slope ρ of the line relates to a frequency drift between the first and second oscillators. The one node determines from the line a frequency adjustment to synchronize the first and second oscillators. In one embodiment, the frequency adjustment is a factor of (1−ρ). An absolute timing adjustment may also be made using the line.

In a decentralized embodiment, the one node may be the second node which adjusts the second oscillator using the frequency adjustment. This approach is also applicable for a broadcast or multicast situation in which multiple second nodes may be synchronized by one first node broadcasting or multicasting synchronization messages. In a centralized embodiment, the one node is the first node which sends a message to the second node that includes the frequency adjustment for adjusting the second oscillator.

In one example implementation, the first node is a timeserver and the second node is a client node, and the messages are transported over a packet-switched network. In one application among many others, the system is a mobile communications system, the first node may be a radio network controller, and the second node is a radio base station. Alternatively, the first node may be a radio base station, and the second node is a radio network controller. The messages between the radio base station and the radio network controller are packet-switched.

For more accurate absolute timing synchronization between the first and second nodes, roundtrip time delay measurements (rather than one-way measurements) may be used. The one-way measurements are made, and then the second node includes or associates with the message a third timestamp corresponding to a time when the second node sends that message back to the first node. The first node includes or associates with each received message a fourth timestamp corresponding to a time when the first node received that message. One of the first and second nodes determines for each received message a first time difference between the corresponding first and second timestamps and a second time difference between the corresponding third and fourth timestamps. From multiple sets of first and second time differences, the one node determines a first minimum time difference line and a second minimum time difference line. From those first and second lines, an accurate absolute time adjustment may be determined to synchronize first and second timers in the first and second nodes, respectively. As a network status check, the one node determines whether the slopes of the first and second lines have approximately the same absolute values and whether one of the first and second slopes is positive and the other is negative.

Although various methods may be used by the one node to fit multiple sets of time differences to a line, line fitting is preferably based on a minimum delay principle. Taking the roundtrip measurements as an example, the one node fits the first and second lines to the first and second sets of time differences by identifying at least two minimum delay time difference points for each set of delay values/points. In one approach, the two minimum delay points in the set separated by the longest distance are determined. The one node determines an equation of a line that intersects the two minimum delay time difference points.

A more sophisticated "hybrid" algorithm improves the minimum delay line fitting process by providing more than two minimum delay points from which the line is constructed. A set of delay values is divided into intervals, and a minimum delay point is selected from each interval. Procedures are set forth that determine an optimal number of intervals as well as an optimal number of delay points to be included in each interval.

Other features, aspects, and advantages of the present invention will become apparent from the following detailed description, taken in conjunction with the accompanying drawings, illustrated by way of example the principles of the invention.

DETAILED DESCRIPTION

The following description, for purposes of explanation and not limitation, sets forth specific details, such as particular components, electronic circuitry, techniques, etc., in order to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multi-function hardware. Processing functions may be implemented using a programmed microprocessor or general-purpose computer, using an application specific integrated circuit (ASIC), and/or using one or more digital signal processors (DSPs).

Figure 5:
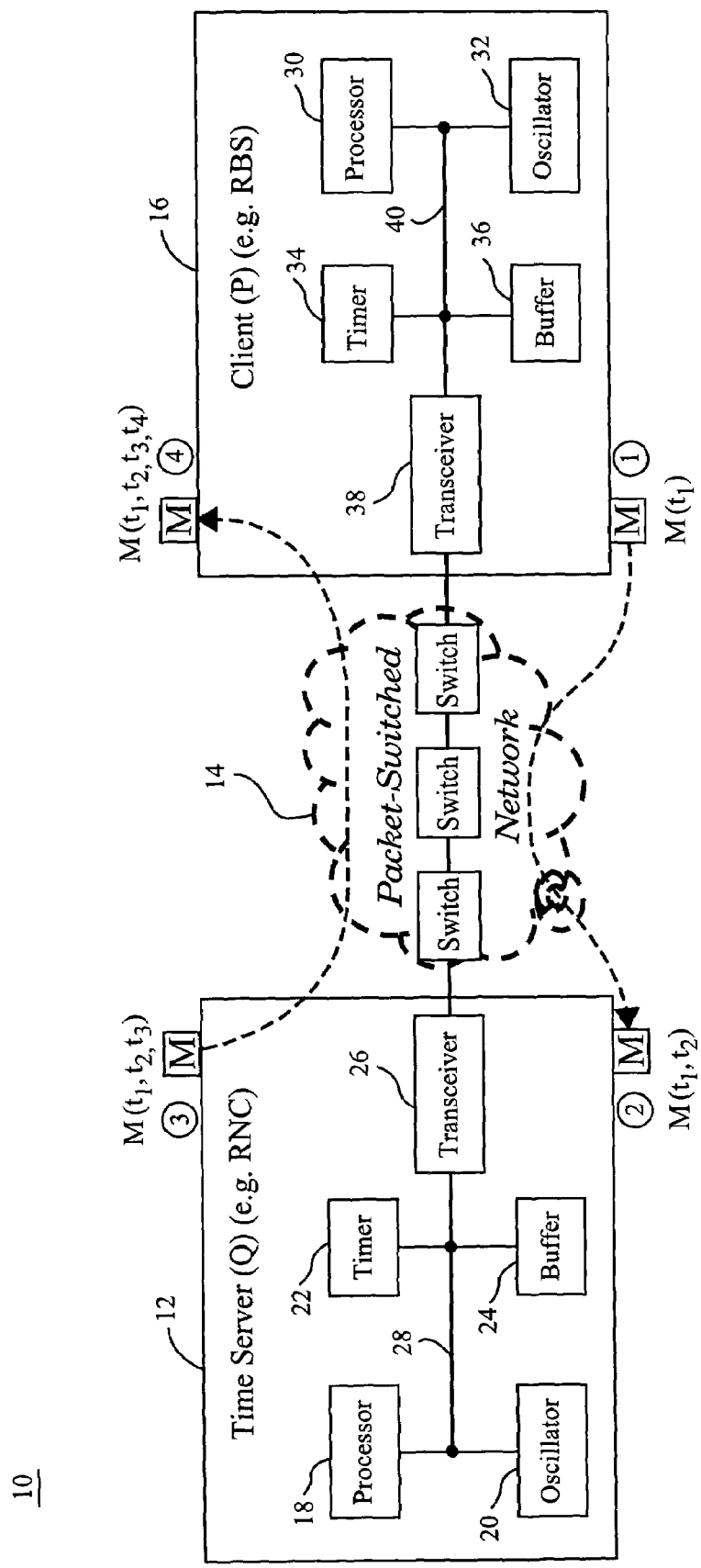
FIG. 5 is function block diagram to describe synchronization procedures between a timeserver node and a client node.

FIG. 5 shows an example communications system 10 including a timeserver node (Q) 12 and a client node (P) 16 coupled together via a packet-switched network 14. In one non-limiting example application to a radio access network (RAN), the timeserver 12 may be a radio network controller (RNC), the packet-switched network may be an Ethernet, an IP network, or an ATM network, and the client may be a radio base station (RBS). The packet-switched network 14 includes one or more intermediary switching and repeater nodes. The timeserver and the client should be synchronized. In different, non-limiting embodiments, they are frequency synchronized, absolute-time synchronized, or both.

The timeserver 12 includes a processor 18, an frequency oscillator 20, an absolute time timer 22, a buffer 24 for storing data packets to be sent and received, and a transceiver 26 for sending and receiving data packets. The function blocks 18-26 communicate over a bus 28. The client 16 includes a processor 30, an frequency oscillator 32, an absolute time timer 34, a buffer 36 for storing data packets to be sent and received, and a transceiver 38 for sending and receiving data packets. The function blocks 30-38 communicate over a bus 40. A timestamp message M, such as an NTP message, is generated by one of the processors, stored in its buffer, and transmitted via its transceiver over the packet-switched network 14.

For purposes of illustration, a preferred example synchronization embodiment is described using roundtrip measurements. Absolute time synchronization is usually better achieved using roundtrip measurements—frequency synchronization only requires one-way measurements. But roundtrip measurements may also be desirable for frequency synchronization since they permit the frequency drift to be measured independently in two ways, thereby limiting negative congestion effects in either the uplink or downlink direction.

The client 16 sends a timestamp message M, e.g., a procedure-class NTP message, to the timeserver 12 which echoes the message M back to the client 16. When sending the message, the client 16 inserts a local time (absolute time) $t_1$ output by its timer 34 in the message M (①). The timeserver 12 receives the message M and adds the local time $t_2$ output by its timer 22 to the message (②). The timeserver 12 sends the message M back to the client 16 at time $t_3$ (③) and inserts the local time $t_3$ into the message M. The client 16 receives the message M at local time $t_4$ (④) and inserts $t_4$ into the message M.

This synchronization procedure is decentralized. Each client-originated message M includes all four timestamps. The timeserver 12 therefore need not monitor every client for synchronization. Instead, the timeserver 12 simply waits to receive a timestamp message from each client. A centralized approach may also be used where the timeserver 12 sends the timestamp messages to poll each client 16. But the centralized approach requires sending an additional adjustment message from the timeserver to the client. Both decentralized and centralized approaches may also be used with one-way differential time measurements—either uplink or downlink directions. One-way differential time measurements in the downlink direction are applicable for broadcast or multicast synchronization in which a timeserver simultaneously sends timestamp messages to a group of clients.

Synchronization requires compensation for a message delay between the timeserver 12 and the client 16. The delay includes a propagation delay (travel time) and a processing delay in the timeserver, the client, and any intermediary nodes. But that message delay changes because the propagation delay and/or processing delay changes. For example, propagation times vary because the messages travel different paths through the packet-switched network. The processing delays vary because of changing queuing delays in the intermediary nodes, timeserver, and/or client. Differential timestamps allow both delay sources to be accounted for.

Figure 1:
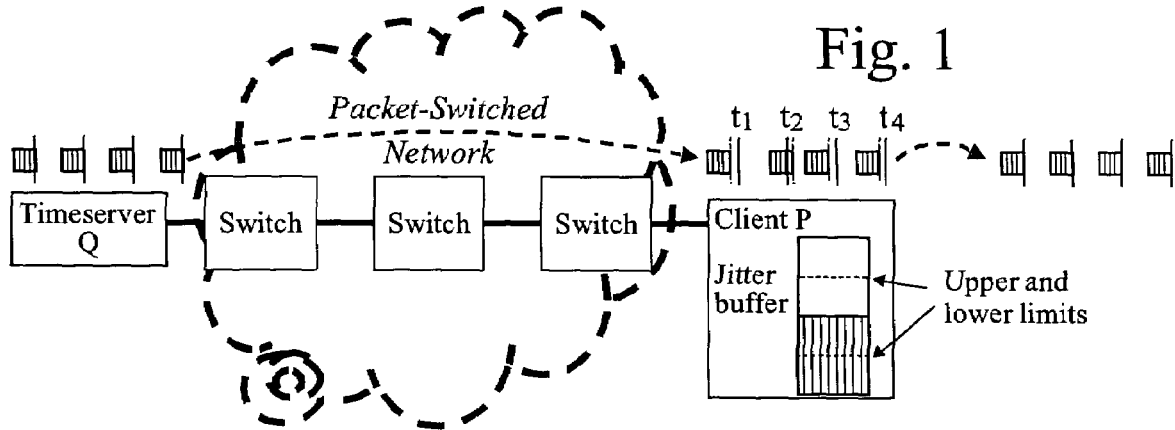
FIG. 1 illustrates a jitter buffer synchronization method.
Figure 2:
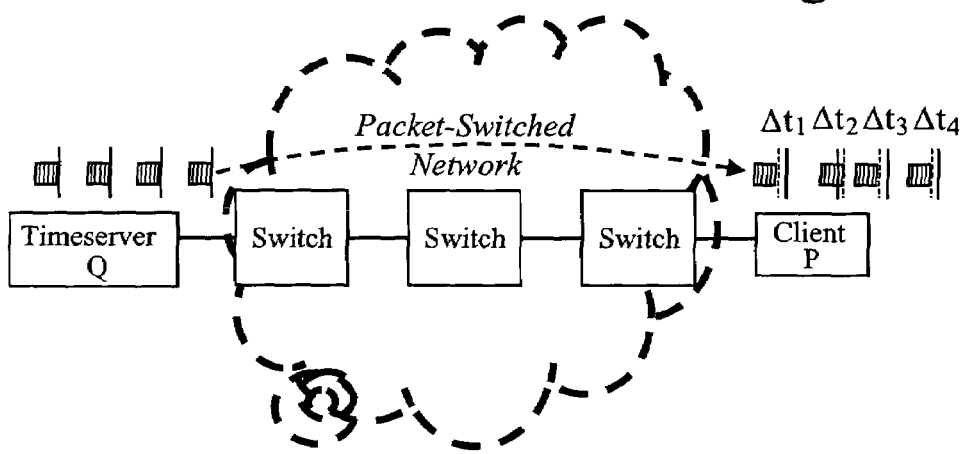
FIG. 2 illustrates frequency synchronization using periodic timestamps.
Figure 3:
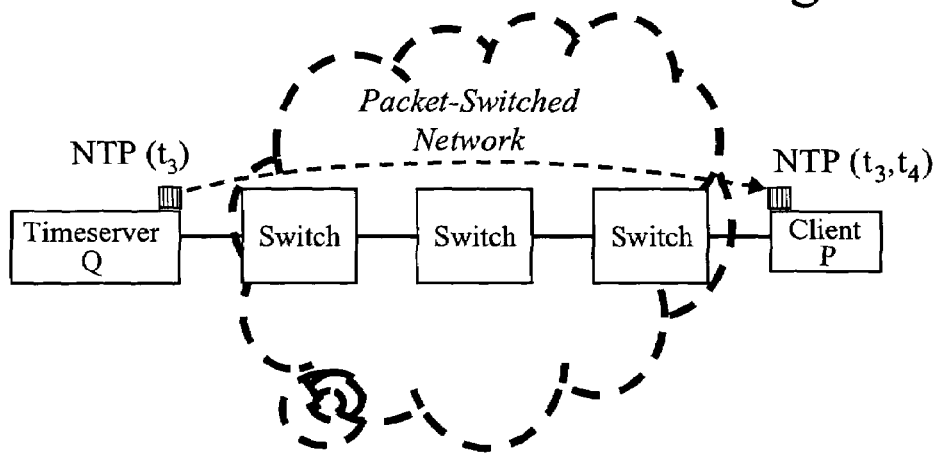
FIG. 3 illustrates sending timestamps.
Figure 4:
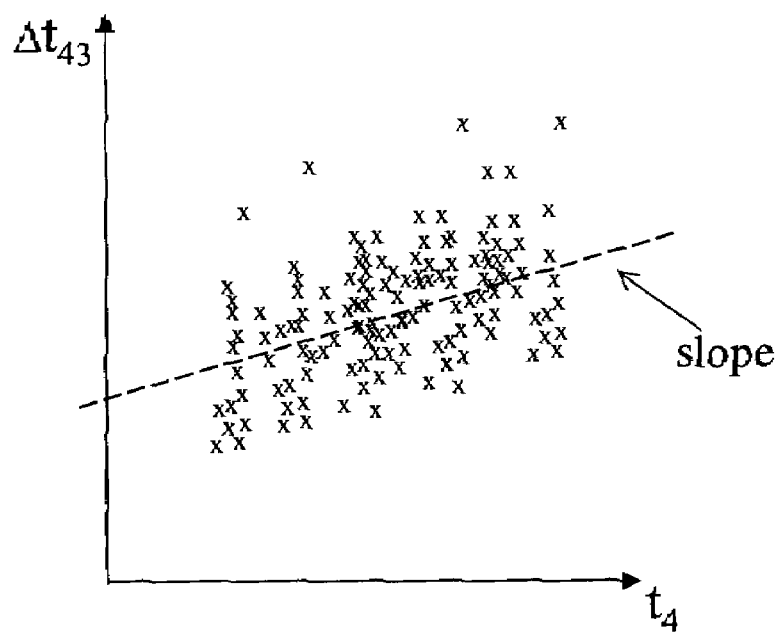
FIG. 4 illustrates a drift of differential times estimated by fitting a line to the differential time values.

FIG. 4 (already described above) shows the numerous different delay values (x's) in sending different messages from the timeserver to the client. The message delay has a probability density function (PDF). It is preferable to evaluate a large number of timestamp messages during a short time period because of queuing effects in the intermediary nodes. A snapshot of this distribution can be obtained by using a large number of messages.

Figure 6:
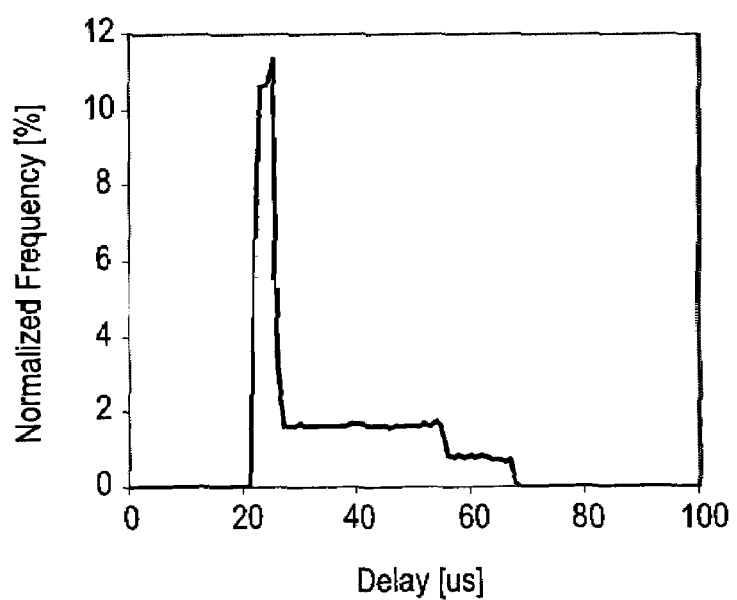
FIG. 6 is a graph showing a typical delay distribution of a group of Ethernet message between the timeserver and client.

Rather than using an average delay value determined from all of the measured delays, synchronization in the present invention is determined based on a minimum delay. The minimum delay time that a timestamp message may experience is well defined by the part of the switch processing that is essentially constant, e.g., shortest intermediary switch path, minimum processing time for such functions as address lookup, prioritization, error-detecting codes, etc. The minimum delay time is plainly indicated by the waveform peak in FIG. 6. The maximum time or the average time, on the other hand, is less well defined since a timestamp may be subjected to variable delay amounts due to different amounts of, e.g., queuing in each intermediary node.

The framework for both frequency and absolute time synchronization using the minimum delay principle is now explained. As explained for the example shown in FIG. 5, the client sends timestamp messages M (e.g., NTP messages). In the roundtrip example, each message M includes four timestamps $t_1$, $t_2$, $t_3$ and $t_4$ when it returns to the client. There is a varying difference or "drift" in the client's oscillator 32 relative to the timeserver's oscillator 20. That drift $\rho$ is illustrated in FIG. 4.

Let $t_{min}+\alpha$ and $t_{min}+\beta$, $\alpha \geq 0$, $\beta \geq 0$, be the real time delays experienced by the uplink and downlink, respectively. $t_{min}$ is the minimum time P to Q or Q to P (symmetry is assumed between the up and down links). The variables $\alpha$ and $\beta$ represent the changing delay in the network (e.g., queuing). Assume the local time at P and Q can be expressed in terms of a time difference term $\Delta t_{PQ}$:

$$t_P = t_Q + \Delta t_{PQ} \tag{1}$$

Assume also that $\Delta t_{PQ}$ includes an offset term $t_{offset}$ (the offset between the absolute times generated by the timeserver timer 22 and the client timer 34) and the frequency drift term $\rho$:

$$\Delta t_{PQ} \equiv \rho \cdot t_P + t_{offset} \tag{2}$$

$\Delta t_{PQ}$ may take both positive and negative values.

Two time differences in terms of $t_1$, $t_2$, $t_3$ and $t_4$ can be obtained from a roundtrip timestamp:

$$\Delta t_{43} \equiv (t_4 - t_3) \tag{3}$$

$$\Delta t_{21} \equiv (t_2 - t_1) \tag{4}$$

It is possible to express $t_4$ and $t_2$ in terms of $t_{min}$, $\alpha$, $\beta$, and $\Delta t_{PQ}$:

$$\begin{aligned} t_4 &= t_P \\ &= t_Q + \Delta t_{PQ} \\ &= t_3 + t_{min} + \beta + \Delta t_{PQ} => \Delta t_{43} \\ &= t_{min} + \beta + (\rho \cdot t_4 + t_{offset}) \end{aligned} \tag{5}$$

Likewise, we obtain an expression for $t_2$:

$$t_2 = t_Q = t_P - \Delta t_{PQ} = t_1 + t_{min} + \alpha - \Delta t_{PQ} \tag{6}$$

where

-continued $$\Delta t_{PQ} = \rho \cdot t_P + t_{offset}$$
$$= \rho \cdot (t_1 + t_{min} + \alpha) + t_{offset} => \Delta t_{21}$$
$$= (1-\rho)(t_{min} + \alpha) - (\rho \cdot t_1 + t_{offset})$$

Consider the minimum values of $\Delta t_{21}$ and $\Delta t_{43}$ when the messages do not experience any variable delay ($\alpha, \beta=0$):

$$\Delta t_{21,min} = \Delta t_{21}(\alpha=0) = (1-\rho)t_{min} - \rho \cdot t_1 - t_{offset} \quad (7)$$

$$\Delta t_{43,min} = \Delta t_{43}(\beta=0) = t_{min} + (\rho \cdot t_4 + t_{offset}) \quad (8)$$

Figure 7A:
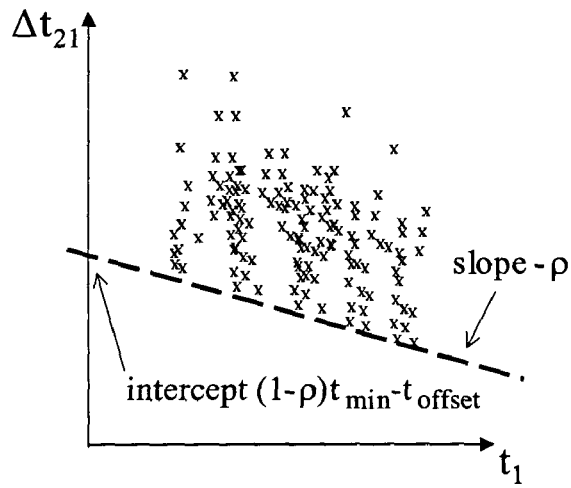
FIGS. 7A and 7B show the principle of fitting a line to a minimum time for uplink and downlink differential time sets.

FIG. 7A shows a plot of $\Delta t_{21}$ vs. $t_1$ according to Eq.(7) with a straight line fit to minimum delay times. The line has a slope $-\rho$ corresponding to the frequency oscillator drift and an intercept with the y-axis of $(1-\rho) t_{min} - t_{offset}$. Similarly, Eq. (8) suggests that minimum delay values in a plot of $\Delta t_{43}$ vs. $t_4$ values shown in FIG. 7B may be fit by a straight line with slope $\rho$ and with a y-axis intercept of $t_{min} + t_{offset}$. By comparing each minimum delay line with the well-known equation for a straight line, y=kx+m, we can identify from the fitted line its slope k and its y-axis intercept m:

$$k_{21} = -\rho \quad (9)$$

$$m_{21} = (1-\rho)t_{min} - t_{offset} \quad (10)$$

$$k_{43} = \rho \quad (11)$$

$$m_{43} = t_{min} + t_{offset} \quad (12)$$

The magnitudes of the uplink and downlink slopes $k_{43}$ and $-k_{21}$ should approximately be the same to assure the significance and accuracy of the result. If $|k_{43}+k_{21}|>\epsilon$, where $\epsilon$ is a threshold parameter, the measurement should be discarded. The reason for this is likely to be congestion in the network.

Equations (10) and (12) give $$m_{43} - m_{21} = \rho t_{min} + 2t_{offset} \approx 2t_{offset} \quad (13)$$

The simplification in Eq. (13) introduces an error in $t_{offset}$. Since the frequency drift is typically $\sim 10^{-8}$ and $t_{min} \sim 10^{-3}$s, this error should be much smaller than one nanosecond, which is acceptable in most cases. Thus, we obtain an expression for $t_{offset}$-the offset between the absolute times generated by the timeserver timer 22 and the client timer 34:

$$t_{offset} = (m_{43} - m_{21})/2 \quad (14)$$

The absolute time of the timer 34 for client (P) 16 can be adjusted by the processor 30 to synchronize the two timers 22 and 34 according to:

$$t_{P,adjusted} = t_Q = \{(1)\} = t_P - \Delta t_{PQ} = \{(2)\} = t_P(1-\rho) - t_{offset} \quad (15)$$

The value for $t_{offset}$ is known from Eq. (14) because the uplink and downlink fitted-line y-axis intercepts, $m_{43}$ and $m_{21}$, are known, and the magnitude of the slope $\rho$ is also known.

From Eqs. (1) and (2), one obtains a relation between the oscillator frequencies of the timeserver (Q) 12 and the client (P) 16:

$$f_Q = (1-\rho)f_P \quad (16)$$

The frequency adjustment to synchronize the client P oscillator 32 to the frequency $f_Q$ of the timeserver Q oscillator 20 can be written as:

$$f_{P,adjusted} = f_Q = (1-\rho)f_P \quad (17)$$

The processor 30 may, for example, send the frequency adjustment value, $f_{P,adjusted}$, to a phase-locked loop which then adjusts the oscillator 32.

Figure 7B:
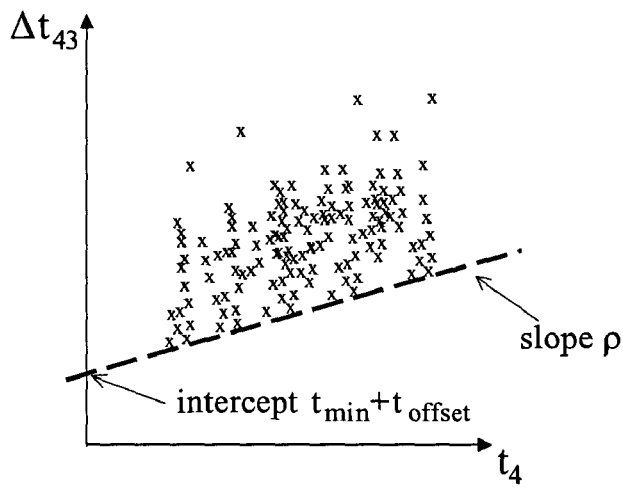

Frequency adjustments and/or absolute time adjustments may also be determined using only one-way delay measurements. Consider for example one-way delay measurements including only $t_3$ and $t_4$ values. FIG. 7B shows $\Delta t_{43}$ plotted vs. $t_4$. If we fit a straight line to the minimum delay values of $\Delta t_{43}$, Eq. (8) can be used to extract $t_{min} + t_{offset}$ and $\rho$. But $t_{min}$ and $t_{offset}$ cannot be separated in the one-way case because there is only one line and three unknowns. But $t_{min}$ can be estimated to some extent with knowledge about intermediary node performance, media delay, etc., so that Eq. (15) may be used to determine an absolute time adjustment for client timer. Still, the absolute time accuracy with only the one-way delay measurements is not as accurate as for the round-trip delay. The frequency adjustment accuracy with one-way delay measurements, however, is the same as for round trip delay measurements because the line slope $\rho$ is known from the one-way delay line, and Eq. (17) may be solved once the line slope $\rho$ is known.

Figure 8:
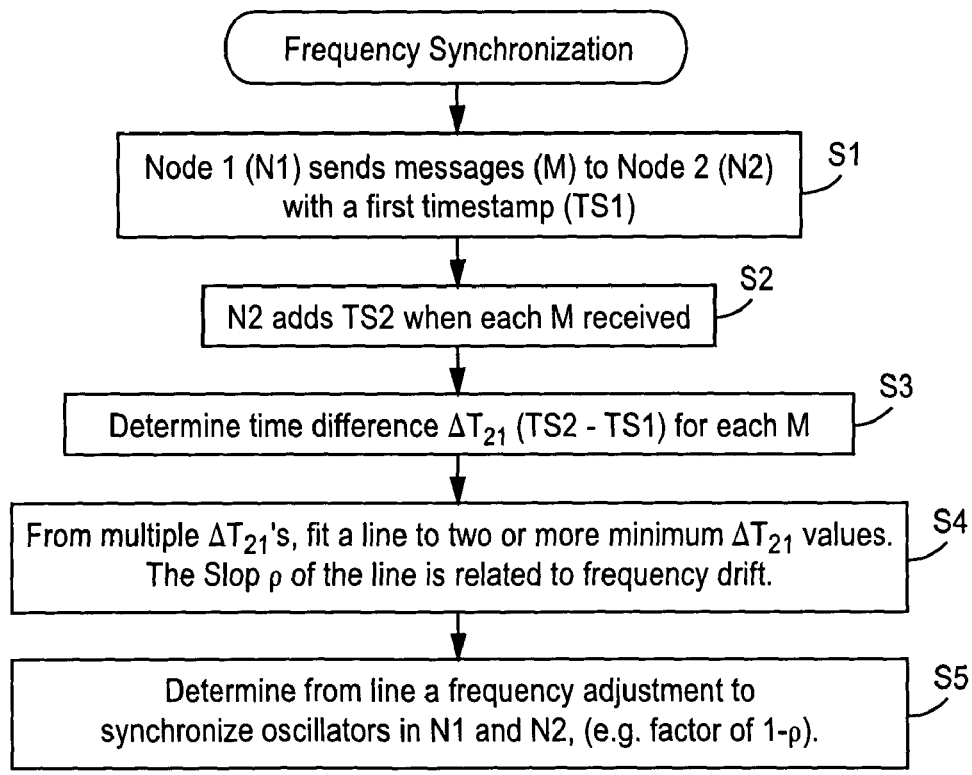
FIG. 8 is a flowchart diagram illustrating example frequency synchronization principles.

Reference is made to example general procedures set forth in a frequency synchronization flowchart in FIG. 8. These procedures assume one-way delay measurements, but roundtrip measurements may be used if desired. A first node N1 sends messages M to a second node N2, with each message M including a first timestamp TS1 corresponding to when the message was sent (step S1). The node N2 adds a second timestamp TS2 when each message M is received (step S2). A time difference $\Delta t_{21}$ is determined (TS2-TS1) for each message (step S3). From multiple $\Delta t_{21}$'s, a line is fit to two or more $\Delta t_{21}$ values from the set of multiple $\Delta t_{21}$'s (step S4). A frequency adjustment is determined from a characteristic of the minimum delay fitted line and used to synchronize the oscillators at nodes N1 and N2 (step S5). In the non-limiting example set forth earlier, the line characteristic is the slope of the line, which is related to frequency drift between the oscillators at nodes N1 and N2, and the frequency adjustment is a factor of 1 minus the slope.

Figure 9:
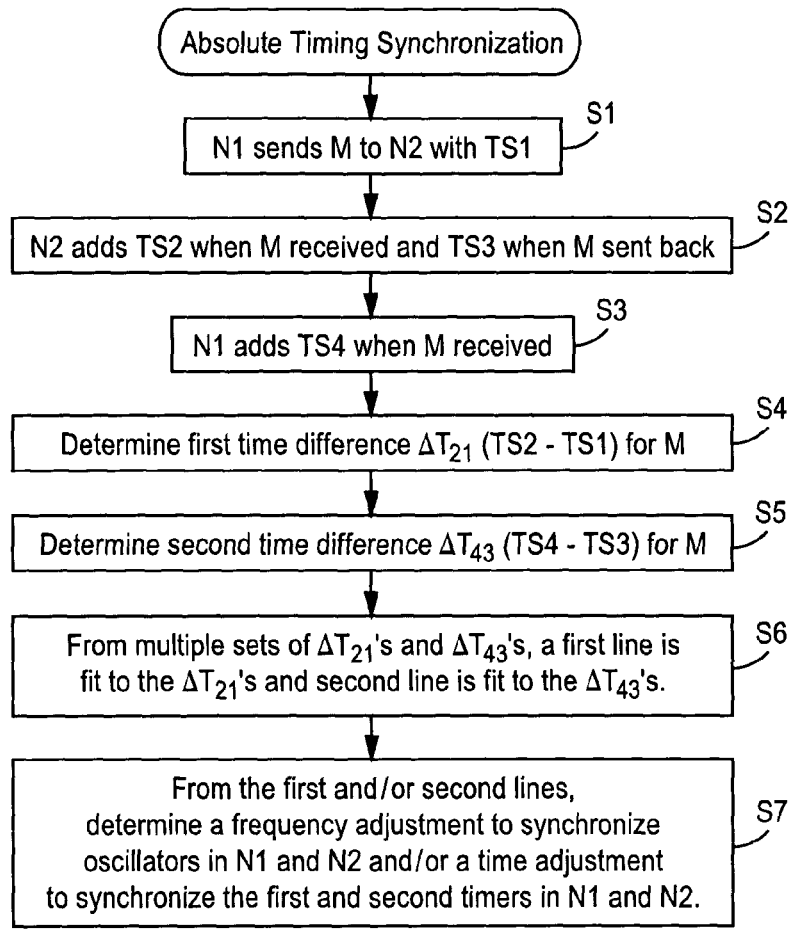
FIG. 9 is flowchart diagram illustrating example absolute timing synchronization principles.

Reference is made to example general procedures set forth in an absolute timing synchronization flowchart in FIG. 9. These procedures assume roundtrip delay measurements, but one-way measurements may be used as described above. The procedures in FIGS. 8 and 9 may be used together or alone or with other procedures.

A first node N1 sends messages M to a second node N2 with each message M including a first timestamp TS1 corresponding to when the message was sent (step S1). The node N2 adds a second timestamp TS2 when each message M is received and a third timestamp TS3 when the message is sent back (step S2). The node N1 adds a fourth timestamp TS4 when the message M is received (step S3). A first time difference $\Delta t_{21}$ is determined (TS2-TS1) for each message (step S4). A second time difference $\Delta t_{43}$ is determined (TS4-TS3) for each message (step S5). From multiple sets of $\Delta t_{21}$'s and $\Delta t_{43}$'s, a first line is fit to two or more $\Delta t_{21}$ values from the set of multiple $\Delta t_{21}$'s, and a second line is fit to two or more $\Delta t_{43}$ values from the set of multiple $\Delta t_{43}$'s (step S6). From the first and second lines, determine a frequency adjustment to synchronize oscillators in N1 and N2 and/or a time adjustment to synchronize the first and second timers in N1 and N2 (step S7).

There are many ways in which lines may be fit to the time delay values. One example technique is to use the well-known least squares algorithm. But the least squares algorithm has a relatively slow convergence time, particularly when a high degree of synchronization is required. Other delay line fitting algorithms that have a faster convergence time are desirable. Two such algorithms will be described: a minimum delay algorithm and a hybrid algorithm.

Figure 10:
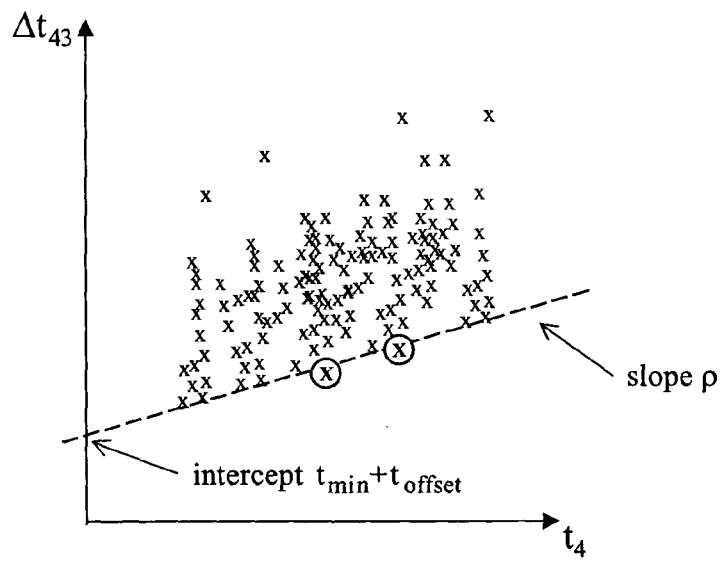
FIG. 10 shows a line for the downlink fitted to two minimum delay points.
Figure 11:
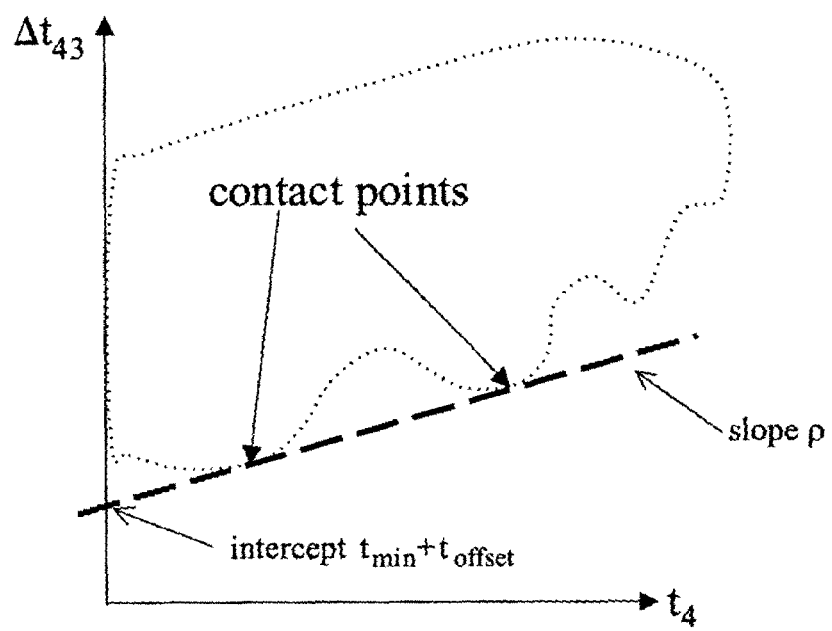
FIG. 11 shows the principle of locating two minimum time values for use in minimum time line fitting.

The minimum delay algorithm aims to fit a straight line to the minimum delay peak like that shown in FIG. 7A. In general, if a straight line were positioned on a curve, the most likely scenario is to have two contact points as illustrated in FIG. 10 and FIG. 11. The idea behind the minimum delay algorithm is to identify these contact points and fit a straight line to these points as shown in FIGS. 10 and 11. Ideally, those two points are a significant distance apart.

Figure 12:
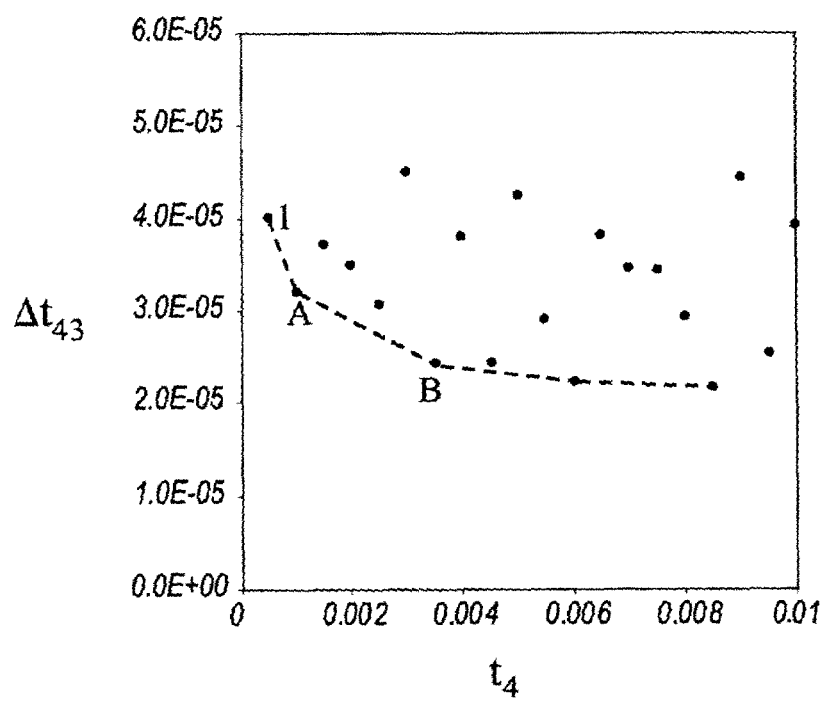
FIG. 12 illustrates a principle of a curve fitting algorithm.

The following procedures illustrated conceptually in FIG. 12 describe how to fit Equations (7) and (8) to minimum message delay values or "points."

1. Calculate multiple slopes, k, from the first Δt data point in the dataset (i.e., "1" in FIG. 12) to all other data points and choose the slope with the minimum value:

$$k_{min1} = \min[(\Delta t_i - \Delta t_1)/(t_i - t_1)], i=2 \text{ to number of data points}$$

2. From the first data point (1) to the data point (A) which corresponds to $k_{min,1}$, calculate the distance $l_1$ from the first data point (1) to the new data point (A):

$$l_1^2 = (\Delta t_A - \Delta t_1)^2 + (t_A - t_1)^2$$

3. Calculate slopes from point A to all remaining experimental message delay data points and choose the minimum slope:

$$k_{minA} = \min[(\Delta t_i - \Delta t_A)/(t_i - t_A)], i=A+1 \text{ to the number of data points}$$

4. From (A) to the message delay data point (B), which corresponds to $k_{minA}$, calculate the distance $l_A$ from the data point (A) to the new data point (B):

$$l_A^2 = (\Delta t_B - \Delta t_A)^{+(} t_B - t_A)^2$$

5. If $l_A^2 > l_1^2$, then $k_{minA}$ is the best approximation; otherwise, $k_{min1}$ is the best approximation so far.

6. From data point (B), repeat steps 3 to 6 until all data points in the set have been evaluated.

In essence, the minimum delay algorithm determines the two minimum delay values that have the longest distance between them. The line is then fitted to intersect those two points. This algorithm is well-suited for evaluating statistical distributions like the one depicted in FIG. 6. In contrast, least-squares algorithms essentially assume Gaussian (symmetrical) distributions and do not apply any filtering to discard outliers in the data set.

A drawback of the minimum delay algorithm is that its accuracy is only as good is the two selected minimum delay points. Better accuracy may be achieved if more than two minimum delay points are used, e.g., by means of minimum delay procedures that employ different weights. Instead of only two contact points, a weighted average of $k_{min,i}$ can be used weighted with $l_i$, $l_i^2$ or $l_i^4$ for example:

$$\rho = \frac{\sum_i k_{min,i} \cdot l_i}{\sum_i l_i} \quad (18)$$

$$\rho = \frac{\sum_i k_{min,i} \cdot l_i^2}{\sum_i l_i^2} \quad (19)$$

-continued $$\rho = \frac{\sum_i k_{min,i} \cdot l_i^4}{\sum_i l_i^4} \quad (20)$$

Figure 13:
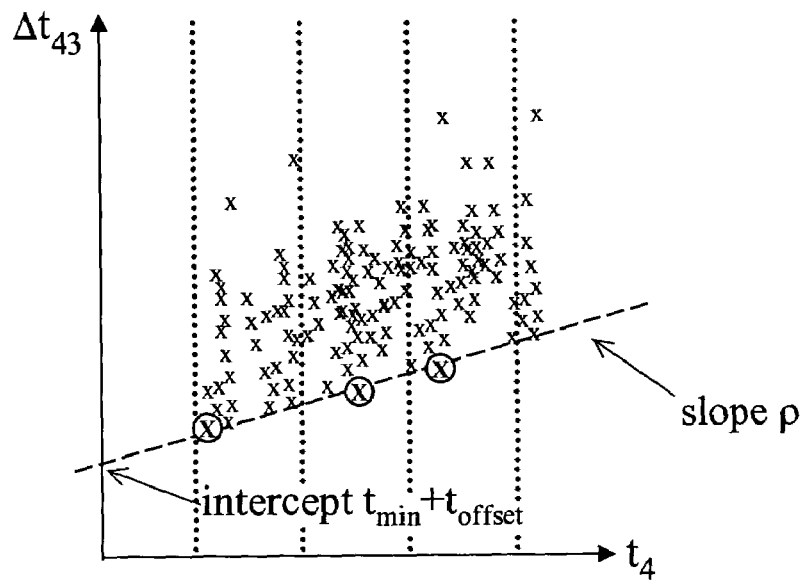
FIG. 13 illustrates a principle of an optimized hybrid curve fitting algorithm.

A second and preferred line-fitting algorithm that also provides better resilience to individual errors in the data points is a combination of the minimum delay algorithm and the least squares algorithm called the "hybrid" algorithm. The hybrid algorithm divides the integration time into a number of intervals and fits a line to the minimum delay value in each interval as depicted in FIG. 13. More intervals mean more data points for the fitting process, which limits the impact of errors in one or more data points on the final result.

Although any number of intervals may be used, it is preferable to determine an optimal number of timestamp delay values to be included in each interval. If the intervals include too few timestamps, the minimum delay value in each interval will not be an accurate minimum value. On the other hand, if too many timestamps are included, the minimum value will not be accurate because the effect of the drift (the slope) will dominate. In other words, the minimum delay values will probably be found in the beginning of an interval (in case of a positive slope) or towards the end of the interval for a negative slope if too many timestamps are included. This artifact introduces an error that can be controlled by limiting the number of timestamps.

An analytical expression for the optimal number of timestamps is set forth below. As seen from Eq. (30), the optimal number of timestamps depends on the number and periodicity of the timestamps, the frequency drift, and the magnitude of packet jitter. In order to optimize the number of timestamps, we try to find a minimum variance of the least squares slope $\sigma_b^2$ which can be expressed as $$\sigma_b^2 = S/\Delta \quad (21)$$

where $$\Delta = S \cdot S_{XX} - (S_x)^2 \quad (22)$$

$$S = \sum_{i=1}^{N} \frac{1}{\sigma_i^2} \quad (23)$$

$$S_x = \sum_{i=1}^{N} \frac{x_i}{\sigma_i^2}$$

$$S_{xx} = \sum_{i=1}^{N} \frac{x_i^2}{\sigma_i^2}$$

where $\sigma_i^2$ is the variance for each delay value or point, and N is the number of delay points used for the fitting, i.e., the number of intervals such as shown in FIG. 13. ssume the following:

There are n data points available in total.
There are m data points in each interval and is the parameter to which $\sigma_b$ should be optimized.

This gives:

$$N = n/m \quad (24)$$

$x_i$ is assumed to be rather periodical, i.e., timestamps are sent more or less periodically.

$t_j$ is this packet jitter and T is the total experimental time
Using the above, we may write $$x_{i=i'}(T/n) \cdot m \quad (25)$$

Let us now make two assumptions regarding $\sigma_i$: It is the same for all delay points ($\sigma_x$), and it is decreasing with the number of delay points in the interval:

$$\sigma_i = \sigma_x = t_j/(c \cdot m) \quad (26)$$

where c is a constant. c=1 corresponds to a uniform jitter PDF, whereas c>1 suggests that more timestamps have smaller jitter, as shown in FIG. 7.

The effect of drift on the standard deviation may be approximated as ½·ρ·(m/n)·T, which results in:

$$\sigma_i \sigma_x = t_j/(c \cdot m) + \frac{1}{2} \cdot \rho \cdot (m/n) \cdot T \quad (27)$$

Using Eqs. (21)-(27) together with the two sums $$\sum_{i=1}^{N} i = \frac{N(N+1)}{2}, \sum_{i=1}^{N} i^2 = \frac{N(N+1)(2N+1)}{6} \quad (28)$$

we obtain $$\sigma_b^2 = \sigma_x^2 \cdot (N/T^2) \cdot 12/(N^2-1) \quad (29)$$

Using Eqs. (24), (27), (29) and minimizing $\sigma_b^2$ with respect to m by taking the derivative $d\sigma_b^2/dm=0$, one obtains an expression for the optimum number of data points in each interval m:

$$m_{optimal} = \sqrt{\frac{3}{2B}\left[(Bn^2+1) - \sqrt{(Bn^2+1)^2 - \frac{4}{9}Bn^2}\right]} \quad (30)$$

where $$B = \frac{1}{2} \cdot c \cdot \rho \cdot t_{av}/t_j \quad (31)$$

and $$t_{av} = T/n \quad (32)$$

$t_{av}$ is the average time between timestamps. Thus, for a given set of n delay points, a known overall time T and known constant c, an estimated packet jitter $t_j$, the optimal number of timestamps $m_{optimal}$ may be calculated using Eqs. (30)-(32).

Figure 14:
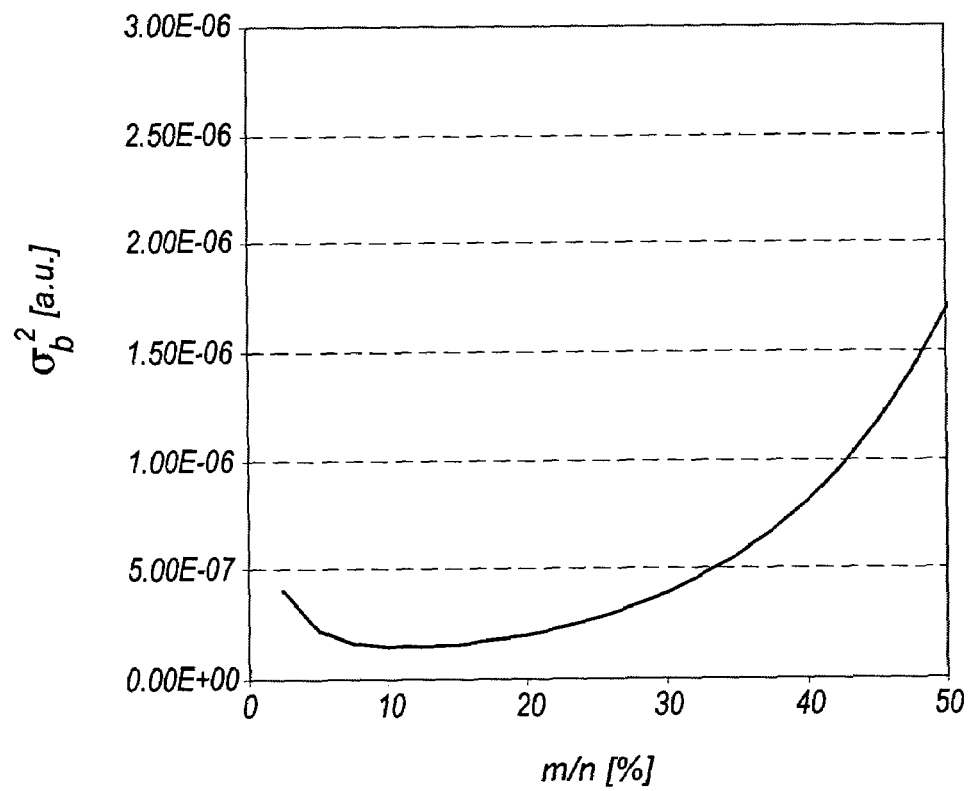
FIG. 14 is a curve illustrating a minimum in the variance of the curve fit, corresponding to an optimum number of timestamps in each interval.

The optimal number of timestamps depends on several factors including drift, jitter, time between timestamps, and number of timestamps. FIG. 14 shows $\sigma_b^2$ versus m/n for the case of 40 timestamps, 30 ms jitter, 32 s between timestamps, and 20 ppb drift. The optimum number of timestamps in each interval is approximately 12%, corresponding to 4 timestamps in each interval.

Figure 15:
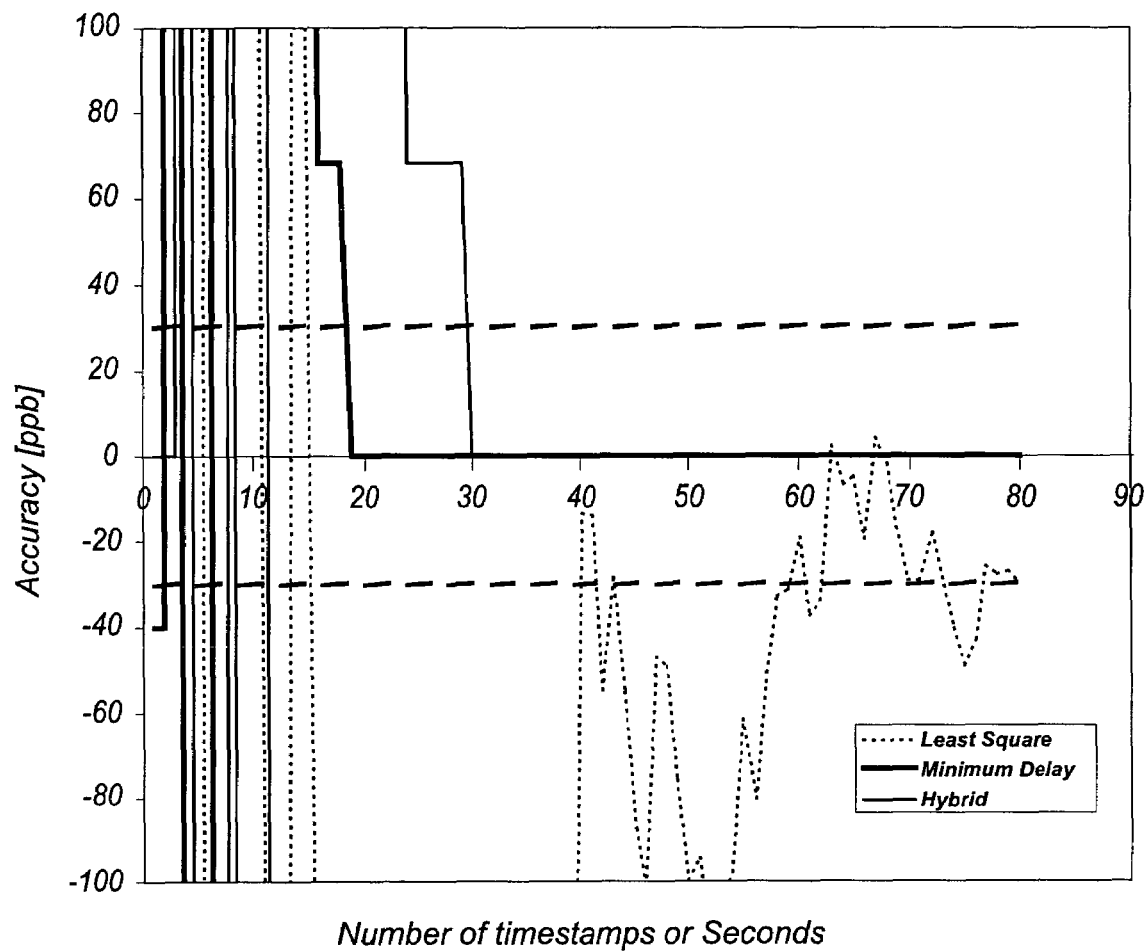
FIG. 15 is a graph illustrating convergence times of different line fitting algorithms.

FIG. 15 shows simulated convergence abilities of various line fitting algorithms versus number of timestamps (or seconds—timestamps are sent every second in this case). The dotted line corresponds to a least-squares algorithm. The thick line corresponds to the minimum delay algorithm, and the thin line corresponds to the hybrid optimal algorithm. Even after 80 timestamps, the least-squares algorithm does not reach a 30 ppb synchronization window. The minimum delay and hybrid optimal algorithms are both much faster, reaching a 30 ppb window within 20 to 30 timestamps. This kind of convergence speed is important for certain synchronization applications. One example is cold start, RBS frequency synchronization which needs to be achieved in approximately 5 to 10 minutes.

Synchronization in accordance with various features of the invention provides many benefits. Both frequency and absolute time synchronization may be achieved. The packet-switched network intermediate nodes need not be changed. When comparing equal amount of timestamp traffic, synchronization is achieved much faster compared to other synchronization algorithms. Timestamp periodicity is not required which facilitates increased timestamp traffic thereby speeding up the synchronization process even further. It is possible to reach 50 ppb accuracy within a few minutes with this method making it possible to cold start an RBS using this synchronization scheme. Packet loss is not a problem, and a standard master-client configuration is readily supported, as well as broadcast/multicast configurations. The preferred use is in a decentralized configuration, but the synchronization procedure can also be used in centralized configurations such as NodeSync over the Iub interface in a UMTS type communications network. Further, the roundtrip embodiment is resilient to network congestion effects since the frequency drift can be estimated in two independent ways so that artifacts can be easily sorted out. The invention may be applied to any packet-switched, asynchronous network, non-limiting examples being Ethernet, ATM, IP, etc.

While the invention has been described in connection with what is presently considered to be the most practical and preferred embodiments, the invention is not limited to the disclosed embodiments. Rather the invention covers various modifications and equivalent arrangements included within the scope of the appended claims.

The invention claimed is:

1. A communications system comprising:
   a first node having a first oscillator for sending multiple messages over a network and including or associating with each message a first timestamp corresponding to a time when the first node sent that message, and
   a second node having a second oscillator for receiving each message and including or associating with that message a second timestamp corresponding to a time when the second node received that message,
   wherein one of the first and second nodes is configured to determine for each message a first time difference between the corresponding first and second timestamps, and from multiple first time differences, to fit a line to two or more minimum delay values of the first time differences, a characteristic of the line being related to a frequency drift between the first and second oscillators,
   wherein the one node is configured to determine from the line a frequency adjustment to synchronize the first and second oscillators, and
   wherein the characteristic of the line is a slope ρ of the line and the one node is configured to adjust the second oscillator by a factor of 1−ρ.

2. The system in claim 1, wherein the first node is configured to adjust the first oscillator using the frequency adjustment.

3. The system in claim 1, wherein the first node is configured to send a message to the second node to adjust the second oscillator using the frequency adjustment.

4. The system in claim 1, wherein the one node is the second node configured to adjust the second oscillator using the frequency adjustment.

5. The system in claim 1, further comprising:
   a first node having a first oscillator for sending multiple messages over a network and including or associating with each message a first timestamp corresponding to a time when the first node sent that message, and a second node having a second oscillator for receiving each message and including or associating with that message a second timestamp corresponding to a time when the second node received that message, wherein one of the first and second nodes is configured to determine for each message a first time difference between the corresponding first and second timestamps, and from multiple first time differences, to fit a line to two or more minimum delay values of the first time differences, a characteristic of the line being related to a frequency drift between the first and second oscillators, wherein the one node is configured to determine from the line a frequency adjustment to synchronize the first and second oscillators, wherein the system further comprises:

plural second nodes, wherein the first node and the second nodes are configured so that the first node synchronizes the second nodes by broadcasting the frequency adjustment to the second nodes.

6. The system in claim 1, wherein the one node is the first node configured to send a message to the second node that includes the frequency adjustment for adjusting the second oscillator.

7. The system in claim 1, wherein the first node is a timeserver and the second node is a client node and the messages are transported over a packet-switched network.

8. The system in claim 1, wherein the system is a mobile communications system, the first node is a radio network controller, and the second node is a radio base station.

9. The system in claim 1, wherein the system is a mobile communications system, the first node is a radio base station, and the second node is a radio network controller.

10. The system in claim 9, wherein the messages between the radio base station and the radio network controller are packet-switched.

11. The system in claim 1, wherein the one node is configured to determine an equation of a line that intersects the two minimum first time difference values.

12. The system in claim 11, wherein the one node is configured to determine the two minimum first time difference values from the multiple time differences that are farthest apart.

13. The system in claim 1, wherein the one node is configured to determine an optimal number of minimum values of the first time differences to be used in fitting the line.

14. A communications system comprising:
a first node having a first oscillator for sending multiple messages over a network and including or associating with each message a first timestamp corresponding to a time when the first node sent that message, and a second node having a second oscillator for receiving each message and including or associating with that message a second timestamp corresponding to a time when the second node received that message, wherein one of the first and second nodes is configured to determine for each message a first time difference between the corresponding first and second timestamps, and from multiple first time differences, to fit a line to two or more minimum delay values of the first time differences, a characteristic of the line being related to a frequency drift between the first and second oscillators, wherein the one node is configured to determine from the line a frequency adjustment to synchronize the first and second oscillators, and wherein the one node is configured to divide the first time differences into an optimal number of time slots, determine a minimum time difference value for each time interval, and fit the line to intersect a minimum time difference value for each time interval.

15. The system in claim 14, wherein the one node is configured to determine a minimum number of time difference values for each time interval.

16. A communications system comprising:
a first node having a first oscillator and a first timer for sending messages over a network and including or associating with each message a first timestamp corresponding to a time when the first node sent that message, and a second node having a second oscillator and a second timer for receiving each message and including or associating with that message a second timestamp corresponding to a time when the second node received that message and a third timestamp corresponding to a time when the second node sends that message back to the first node, wherein the first node is configured to include or associate with each received message a fourth timestamp corresponding to a time when the first node received that message, wherein one of the first and second nodes is configured to determine for each received message a first time difference between the corresponding first and second timestamps and a second time difference between the corresponding third and fourth timestamps, and from multiple sets of first and second time differences, to determine a minimum first time difference and a minimum second time difference, and wherein the one node is configured to determine from one or both of the minimum first and second time differences one or both of (1) a frequency adjustment to synchronize the first and second oscillators and (2) a time adjustment to synchronize the first and second timers.

17. The system in claim 16, wherein the first node is configured to adjust the first oscillator to be synchronized with the second oscillator.

18. The system in claim 16, wherein the first node is configured to adjust the first timer to be synchronized with the second timer.

19. The system in claim 16, wherein the first node is configured to send an adjustment message to the second node to adjust one or both of the second oscillator and the second timer.

20. The system in claim 19, further comprising:
plural second nodes,
wherein the first node and the second nodes are configured so that the first node synchronizes the second nodes by broadcasting the adjustment message to the second nodes.

21. The system in claim 16, wherein the first node is a client node and the second node is a timeserver node and the messages are transported over a packet-switched network.

22. The system in claim 16, wherein the system is a mobile radio communications system, the first node is radio base station, and the second node is a radio network controller.

23. The system in claim 16, wherein the system is a mobile radio communications system, the first node is radio network controller, and the second node is a radio base station.

24. The system in claim 22 or 23, wherein the messages between the radio base station and the radio network controller are packet-switched.

25. The system in claim 16, wherein the first node is configured to determine two minimum first time differences that are farthest apart in the multiple sets of first time differences and two minimum second time differences that are farthest apart in the multiple sets of second time differences.

26. The system in claim 25, wherein the one node is configured to determine a first line that fits the two minimum first time differences and a second line that fits the two minimum second time differences, and from the first and second lines, to determine one or both of the frequency adjustment and the time adjustment.

27. The system in claim 26, wherein the one node is configured to determine an equation of each of the first and second lines and to use a first slope and a first vertical axis intercept of the first line and a second slope and a second vertical axis intercept of the second line to determine one or both of the frequency adjustment and the time adjustment.

28. The system in claim 27, wherein the one node is configured to determine whether the first slope and the second slope have approximately the same magnitude and whether one of the first and second slopes is positive and the other is negative.

29. The system in claim 16, wherein the one node is configured to determine an optimal number of minimum values of the first time differences to be used in fitting the line to the multiple values of the first time differences.

30. The system in claim 29, wherein the one node is configured to divide multiple values of the first time differences into an optimal number of time slots and determine minimum time difference values for each time interval and fit the line to intersect a minimum time difference value for each time interval.

31. The system in claim 30, wherein the one node is configured to determine a minimum number of time difference values for each time interval.

32. A method for use in a communications system including a first node having a first oscillator and a second node having a second oscillator, comprising:
the first node sending multiple messages over a network and including or associating with each message a first timestamp corresponding to a time when the first node sent that message;
the second node receiving each message and including or associating with that message a second timestamp corresponding to a time when the second node received that message;
determining for each message a first time difference between the corresponding first and second timestamps, and from multiple first time differences, fitting a line to two or more minimum values of the first time differences, a characteristic of the line being related to a frequency drift between the first and second oscillators; and
determining from the line a frequency adjustment to synchronize the first and second oscillators,
wherein the characteristic of the line is a slope $\rho$ of the line and the frequency adjustment is related to $(1-\rho)$.

33. The method in claim 32, wherein the second node adjusts the second oscillator using the frequency adjustment.

34. The method in claim 32, wherein the first node sends a message to the second node that includes the frequency adjustment for adjusting the second oscillator.

35. The method in claim 34 and a second node having a second oscillator, comprising:
the first node sending multiple messages over a network and including or associating with each message a first timestamp corresponding to a time when the first node sent that message;
the second node receiving each message and including or associating with that message a second timestamp corresponding to a time when the second node received that message;
determining for each message a first time difference between the corresponding first and second timestamps, and from multiple first time differences, fitting a line to two or more minimum values of the first time differences, a characteristic of the line being related to a frequency drift between the first and second oscillators; and
determining from the line a frequency adjustment to synchronize the first and second oscillators,
wherein the communications system includes plural second nodes and the first node synchronizes the second nodes by broadcasting the frequency adjustment message to the second nodes.

36. The method in claim 32, further comprising:
determining an equation of a line that intersects the two minimum time difference values.

37. The method in claim 36, further comprising:
determining the two minimum time difference values that are farthest apart.

38. A method for use in a communications system including a first node having a first oscillator and a second node having a second oscillator, comprising:
the first node sending multiple messages over a network and including or associating with each message a first timestamp corresponding to a time when the first node sent that message;
the second node receiving each message and including or associating with that message a second timestamp corresponding to a time when the second node received that message;
determining for each message a first time difference between the corresponding first and second timestamps, and from multiple first time differences, fitting a line to two or more minimum values of the first time differences, a characteristic of the line being related to a frequency drift between the first and second oscillators; and
determining from the line a frequency adjustment to synchronize the first and second oscillators,
the method further comprising:
determining an optimal number of minimum values of the first time differences to be used in fitting the line.

39. The method in claim 38, further comprising:
dividing multiple values of the first time differences into an optimal number of time slots;
determining a minimum time difference value for each time interval; and
fitting the line to intersect a minimum time difference value for each time interval.

40. The method in claim 39, further comprising:
determining a minimum number of time difference values for each time interval.

41. The method in claim 32, wherein the first node is a timeserver and the second node is a client node and the messages are transported over a packet-switched network.

42. The method in claim 32, wherein the system is a mobile communications system, the first node is a radio network controller, and the second node is a radio base station.

43. The method in claim 32, wherein the system is a mobile communications system, the first node is a radio base station, the second node is a radio network controller, and wherein the messages between the radio base station and the radio network controller are packet-switched.

44. A method for use in a communications system including a first node having a first oscillator and a second node having a second oscillator, comprising:

the first node sending multiple messages over a network and including or associating with each message a first timestamp corresponding to a time when the first node sent that message;

the second node receiving each message and including or associating with that message a second timestamp corresponding to a time when the second node received that message;

determining for each message a first time difference between the corresponding first and second timestamps, and from multiple first time differences, fitting a line to two or more minimum values of the first time differences, a characteristic of the line being related to a frequency drift between the first and second oscillators; and determining from the line a frequency adjustment to synchronize the first and second oscillators, wherein the first node includes a first timer and the second node includes a second timer, the method further comprising:

the second node includes or associates with the message a third timestamp corresponding to a time when the second node sends that message back to the first node;

the first node includes or associates with each received message a fourth timestamp corresponding to a time when the first node received that message;

determining for each received message a first time difference between the corresponding first and second timestamps and a second time difference between the corresponding third and fourth timestamps, and from multiple sets of first and second time differences, determining a minimum first time difference and a minimum second time difference; and determining from one or both of the minimum first and second time differences one or both of (1) a frequency adjustment to synchronize the first and second oscillators and (2) a time adjustment to synchronize the first and second timers.

45. The method in claim 44, further comprising:

determining a first line that fits the multiple sets of first time differences and a second line that fits the multiple sets of second time differences, and from the first and second lines, determining one or both of the frequency adjustment and the time adjustment.

46. The method in claim 42, wherein the communications system includes plural second nodes, the method further comprising:

the first node broadcasting one or both of the frequency adjustment and the time adjustment to the second nodes.

47. The method in claim 42, wherein the first and second lines are fit to the first and second sets of time differences by identifying at least two minimum time difference points for each set and determining an equation of a line that intersects the two minimum delay time difference points.

48. The method in claim 44, wherein the two minimum time difference points farthest apart in each of the first and second sets are determined.

49. The method in claim 42, further comprising:

using a first slope and a first vertical axis intercept of the first line and a second slope and a second vertical axis intercept of the second line to determine the first and second minimum time differences.

50. The method in claim 46, further comprising:

determining whether the first slope and the second slope have approximately the same magnitude and whether one of the first and second slopes is positive and the other is negative.

51. A first node for use in a communications system, comprising:

a first oscillator;

a controller for receiving multiple messages from another node over a network, each message having a first timestamp corresponding to a time when the other node sent that message, and for including or associating with that message a second timestamp corresponding to a time when the node received that message, wherein the controller is configured to (1) determine for each message a first time difference between the corresponding first and second timestamps, and from multiple first time differences, fit a line to two or more minimum values of the first time differences, a characteristic of the line being related to a frequency drift between the first and second oscillators, and (2) determine from the line a frequency adjustment to synchronize the first oscillator with the second oscillator in the other node, and wherein the characteristic of the line is a slope $\rho$ of the line and the frequency adjustment is related to $(1-\rho)$.

52. The node in claim 51, wherein the controller is further configured to:

determine an equation of a line that intersects the two minimum time difference values.

53. The node in claim 52, wherein the controller is further configured to:

determine the two minimum time difference values that are farthest apart.

54. The node in claim 51, wherein the controller is further configured to:

determine an optimal number of minimum values of the first time differences to be used in fitting the line.

55. A first node for use in a communications system, comprising:

a first oscillator;

a controller for receiving multiple messages from another node over a network, each message having a first timestamp corresponding to a time when the other node sent that message, and for including or associating with that message a second timestamp corresponding to a time when the node received that message, wherein the controller is configured to (1) determine for each message a first time difference between the corresponding first and second timestamps, and from multiple first time differences, fit a line to two or more minimum values of the first time differences, a characteristic of the line being related to a frequency drift between the first and second oscillators, and (2) determine from the line a frequency adjustment to synchronize the first oscillator with the second oscillator in the other node, wherein the controller is further configured to:

divide multiple values of the first time differences into an optimal number of time slots;

determine a minimum time difference value for each time interval; and fit the line to intersect a minimum time difference value for each time interval.

56. The node in claim 55, wherein the controller is further configured to:
  determine a minimum number of time difference values for each time interval.

57. The node in claim 51, wherein the node is a timeserver and the other node is a client node and the messages are transported over a packet-switched network.

58. The node in claim 51, wherein the communications system is a mobile communications system, the node is one of a radio network controller and a radio base station and the other node is the other of the radio network controller and the radio base station.

59. A first node for use in a communications system, comprising:
  a first oscillator;
  a controller for receiving multiple messages from another node over a network, each message having a first timestamp corresponding to a time when the other node sent that message, and for including or associating with that message a second timestamp corresponding to a time when the node received that message,
  wherein the controller is configured to (1) determine for each message a first time difference between the corresponding first and second timestamps, and from multiple first time differences, fit a line to two or more minimum values of the first time differences, a characteristic of the line being related to a frequency drift between the first and second oscillators, and (2) determine from the line a frequency adjustment to synchronize the first oscillator with the second oscillator in the other node,
  the node further comprising:
  first timer;
  wherein the controller is further configured to:
  include or associate with the message a third timestamp corresponding to a time when the node sends that message back to the other node which includes or associates with each received message a fourth timestamp corresponding to a time when the other node received that message;
  determine for each received message a first time difference between the corresponding first and second timestamps and a second time difference between the corresponding third and fourth timestamps, and from multiple sets of first and second time differences, determines a minimum first time difference and a minimum second time difference, and determines from one or both of the minimum first and second time differences one or both of (1) a frequency adjustment to synchronize the first and second oscillators and (2) a time adjustment to synchronize the first and second timers.

60. The node in claim 59, wherein the controller is further configured to:
  determine a first line that fits the multiple sets of first time differences and a second line that fits the multiple sets of second time differences, and
  from the first and second lines, determine one or both of the frequency adjustment and the time adjustment.

61. The node in claim 60, wherein the controller is further configured to:
  fit the first and second lines to the first and second sets of time differences by identifying at least two minimum time difference points for each set and determining an equation of a line that intersects the two minimum delay time difference points.

62. The node in claim 61, wherein the controller is further configured to:
  determine the two minimum time difference points farthest apart in each of the first and second sets.

63. The node in claim 62, wherein the controller is further configured to:
  use a first slope and a first vertical axis intercept of the first line and a second slope and a second vertical axis intercept of the second line to determine the first and second minimum time differences.

64. The node in claim 63, wherein the controller is further configured to:
  determine whether the first slope and the second slope have approximately the same magnitude and whether one of the first and second slopes is positive and the other is negative.

* * * * *